Figure 1:
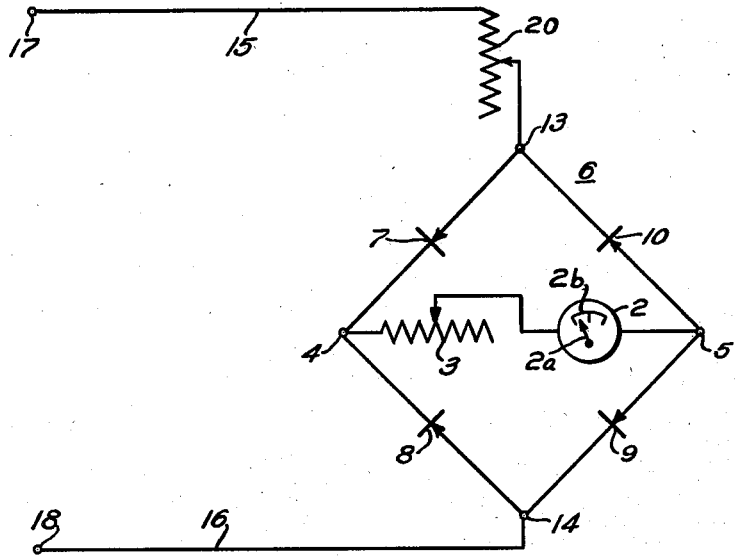

July 21, 1942.   R. C. HITCHCOCK ET AL   2,290,559
ELECTRICAL MEASURING INSTRUMENT
Filed Jan. 8, 1941

WITNESSES:

INVENTORS
Richard C. Hitchcock
and Uel L. Smith.
BY
ATTORNEY

Patented July 21, 1942

2,290,559

UNITED STATES PATENT OFFICE 2,290,559

ELECTRICAL MEASURING INSTRUMENT

Richard C. Hitchcock, Upper Montclair, and Uel L. Smith, Morristown, N. J., assignors to Westinghouse Electric & Manufacturing Company, East Pittsburgh, Pa., a corporation of Pennsylvania Application January 8, 1941, Serial No. 373,546

6 Claims. (Cl. 171—95)

The present invention relates to instruments for measuring electrical quantities, such as the voltage and current in an alternating current circuit. It has particular relation to a device in which a direct current responsive instrument is energized through a rectifier unit to measure such alternating current quantities.

An instrument of this type may include, for example, a d'Arsonval type instrument which is energized from the alternating current circuit through a full wave rectifier made up of contact rectifier units connected in a bridge circuit. These contact-type rectifier elements have been found to vary considerably in their individual characteristics in the commercial manufacture thereof, and as a result of this and the inherent properties of these elements, it has been found difficult to construct bridge units which will function exactly the same in the completed measuring devices. Since it is most economical to print duplicate scales or dials for these instruments in mass quantities, it is desirable to provide units having duplicate characteristics. While the instruments may be readily calibrated to cause their pointers to properly coincide with the zero point and the full scale point on the scales by methods well known in the art, these differences in individual characteristics make it extremely difficult to properly calibrate the device at some load between these points, such as half load. It has, therefore, been found necessary in some instances to resort to special hand marked individual scales which are expensive.

According to the present invention, we provide an instrument of this type wherein the meter element may be readily calibrated at an intermediate load point so as to cause its pointer to coincide with a selected point on the dial at such a load. In doing this we utilize the peculiar characteristics which are possessed by rectifiers such as those of the contact type. These include the well known characteristic that the forward resistance of a single rectifier element or disk decreases more rapidly for unit increase in voltage at a higher applied voltage than it does for a lower one. The structure necessary to accomplish this includes merely a pair of variable impedance members connected in the rectifier circuit.

It is, accordingly, an object of the present invention to provide a novel and improved alternating current measuring instrument of the rectifier direct current meter type.

Another object of the invention is to provide a measuring instrument of the rectifier direct current meter type with means for adjusting the meter current at one predetermined value of the quantity to be measured without changing such current at another predetermined value of the quantity.

A further object of the invention is to provide a measuring instrument of the rectifier direct current type having means for calibrating the instrument to cause its indicating pointer to properly coincide with a predetermined scale.

Figure 2:
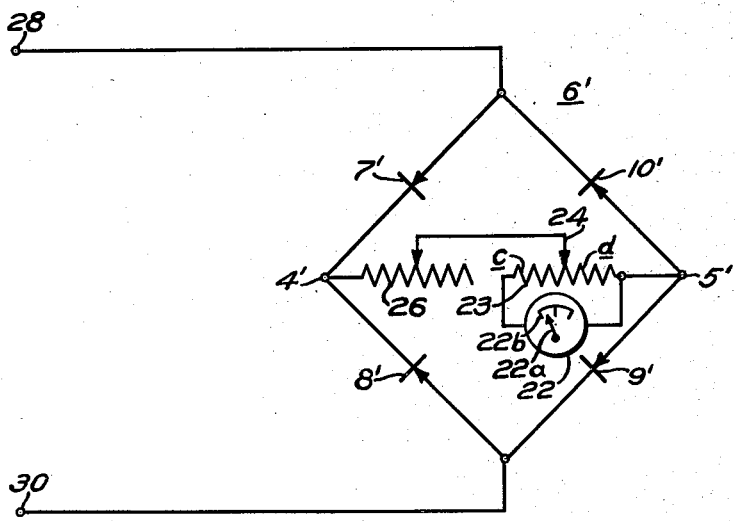

Other objects and advantages of the invention will appear from the following description read in conjunction with the accompanying drawing, in which:

Figure 1 is a schematic diagram of the measuring instrument constructed in accordance with the invention; and Fig. 2 is a diagram similar to that of Fig. 1 of a modification of the invention.

Referring to Fig. 1, a direct current measuring instrument 2 which may be of the permanent magnet moving coil or d'Arsonval type includes a pointer 2a adapted to move across a scale 2b to a position proportional to the current passing therethrough. On this scale are shown three marks which represent zero, half and full loads, respectively.

An adjustable resistance 3 is disposed in series with the instrument 2 and this series circuit is connected across terminals 4 and 5 of a bridge connected rectifier 6. The rectifier, in turn, is made up of contact type rectifier elements 7, 8, 9 and 10 which may be of the copper oxide type connected in bridge arrangement to be energized at contacts 13 and 14. Conductors 15 and 16 extend from these input terminals to main instrument terminals 17 and 18 which are disposed to be connected in the circuit that is to be measured. Disposed in series arrangement in the conductor 15 is an adjustable resistance 20.

It will be noted that the rectifier unit 6 is so connected that when the terminal 17 is energized positively the current will travel from it through the resistance 20, the rectifier element 7, the adjustable resistance 3, the direct current meter 2, and rectifier element 9 to the conductor 16. During the opposite cycle of the alternating current quantity, the direct current will likewise flow through the instrument 2 in this same direction to provide full wave rectification.

The operation of this circuit may best be understood by studying a specific example, the operation of which is given in the table below,

| $E_{AC}$ | $R_{AC}$ | $R_{DC}$ | $R_L$ | $I_{DC}$ | $E_{AC}$ | $I_{DC}$ |
|---|---|---|---|---|---|---|
| Volts | Ohms | Ohms | Ohms | Micro-amperes | Per cent | Per cent |
| 2.0 | 0 | 23,300 | 100 | 60 | 100 | 100 |
| 2.0 | 17,800 | 0 | 100 | 60 | 100 | 100 |
| 1.0 | 0 | 23,300 | 100 | 26.2 | 50 | 43.7 |
| 1.0 | 17,800 | 0 | 100 | 22.5 | 50 | 37 | in which $E_{AC}$ equals the voltage impressed across the terminals 17 and 18. $R_{AC}$ equals the resistance of the adjustable member 20, $R_{DC}$ equals the resistance of the adjustable member 3, $R_L$ is the resistance of the instrument 2 and $I_{DC}$ equals the current flowing through the instrument 2.

It will appear from this table that 60 microamperes of current will flow through the instrument 2 when two volts are impressed across the terminals 17 and 18 under the conditions shown in the first two lines of the table. In the first of these conditions the resistance $R_{AC}$ in the alternating current side of the device is equal to zero, while the resistance $R_{DC}$ on the output side of the rectifier equals 23,300 ohms. In the second case $R_{AC}$ the resistance in the alternating current side is equal to 17,800 ohms, and the resistance on the direct current side is made equal to zero. Two volts for $E_{AC}$ have arbitrarily been selected as the full load indication of the device, while the 60 microamperes of current which flows through the instrument in either of these cases is taken as 100% for this current. Referring to the condition when only one volt is impressed on the device, it will be seen that the current through the instrument is 26.2 microamperes in the first case and 22.5 in the second. Thus, while the current through the instrument 2 at full load is the same irrespective of whether the resistance is in the alternating current or direct current side, there is a difference of 6.7% in the currents therethrough when only half the normal voltage is impressed on the device.

It will thus appear that the current flowing through the instrument at one-half full voltage may be varied between the two limits shown in the table by properly balancing the two adjustable resistances 20 and 3, respectively. In this manner the pointer 2a is made to coincide with the intermediate mark on the scale 2b when the selected intermediate voltage is impressed on the terminals 17 and 18. This may, of course, be done while still obtaining 60 microamperes of current through the instrument when the voltage being measured is equal to two volts. This operation is preferably performed after the instrument has first been calibrated for zero and for full scale voltage by a known method and makes it possible to calibrate the device at an intermediate load so that scales which have been produced in quantity may be conveniently employed for the different instruments despite the ordinary differences in characteristics which will be encountered.

While the arrangement shown in Fig. 1 may be preferred for use with voltmeters, we have found it desirable to employ the modification shown in Fig. 2 in the case of more sensitive microammeters. In this figure a rectifier unit 6' comprises contact type elements designated as 7', 8', 9' and 10' and connected in the same manner as those in Fig. 1. In this case, however, a d'Arsonval type milliammeter 22 has connected across the terminals thereof a resistance member 23 including contact arm 24 which is movable therealong for dividing it into two portions $c$ and $d$ of adjustable resistance characteristics. One of the terminals of the microammeter is connected to an output terminal 5' of the rectifier bridge, while the resistance arm 24 is connected through a variable resistance member 26 to the other output terminal 4' of the rectifier unit. Terminals 28 and 30 are connected to the input side of the rectifier 6' so that the current to be measured may be passed therethrough.

The milliammeter 22 includes a pointer 22a cooperating with a scale 22b which is shown on the drawing as including marks representing zero, half and full loads, respectively.

The operation of this modification of Fig. 2 may be best understood upon reference to the table below which reveals the operation of a specific circuit taken by way of example.

| $I_{AC}$ | $R_{26}$ | $R_L$ | $R_C$ | $R_D$ | $I_L$ | $I_{AC}$ | $I_L$ |
|---|---|---|---|---|---|---|---|
| Microamperes | Ohms | Ohms | Ohms | Ohms | Microamperes | Per cent | Per cent |
| 500 | 4,636 | 400 | 0 | 4,000 | 273 | 100 | 100 |
| 500 | 150 | 400 | 3,250 | 750 | 273 | 100 | 100 |
| 250 | 4,636 | 400 | 0 | 4,000 | 122 | 50 | 45 |
| 250 | 150 | 400 | 3,250 | 750 | 137 | 50 | 50 |

In this table $I_{AC}$ equals the alternating current input to the terminals 28 and 30, $R_{26}$ equals the value of the resistance member 26, and $R_L$ equals the resistance of the milliammeter 22. $R_c$ equals the resistance of the portion of 23 indicated at $c$; $R_d$ equals the resistance of the portion of 23 indicated at $d$ and $I_L$ equals the current through the instrument 22.

It will be seen from the figures in the first line of this table that all of the resistance 23 is in shunt with the instrument 22. With 500 microamperes passing through the alternating current circuit, the current through the instrument is equal to 273 microamperes, which is taken as the current required for full scale deflection thereof. In like manner the current through the instrument 22 attains the same value in response to 500 microamperes in the alternating current circuit when the resistance 23 is divided in the manner shown in the second line of the table, and the resistance 26 is reduced to 150 ohms. However, upon the current which it is desired to measure being reduced to half its full scale value, the current through the instrument in the first mentioned circuit is reduced to 45% of its full load value as indicated in the third line of the table. When the energization of the second circuit amounts to 50%, the current through the instrument 22 likewise attains 50% of its full load value.

Thus this embodiment of the invention shown in Fig. 2 also makes it possible to obtain accurate mid-scale calibration. With the device calibrated for zero and full loads, the intermediate calibration may be made by properly adjusting the resistors 26 and 23 to cause the pointer to coincide with a proper point on the scale. For example, if it is desired to energize the instrument 22 slightly more to move the pointer 22a forward to the intermediate mark on the scale 22b, the arm 24 must be moved to the left to reduce the resistance of the portion $c$ of the circuit. This, of course, results in a larger proportion of the direct current output of the rectifier passing through the instrument, although at the same time it increases the total current which will flow therethrough at full load. This latter value may be reduced, however, by increasing the resistance of the member 26.

The operation of the invention is based upon the inherent properties of the rectifier elements. One of these properties is that the forward resistance of each element is not constant but decreases as the voltage across it increases. The rate of decrease is more rapid the higher the voltage and the invention utilizes this characteristic by so adjusting the various resistance so as to select the portion of the voltage range which gives the desired scale distribution. Even the best of these rectifier elements also have a measurable back current and, as the forward current decreases in making a more sensitive microammeter, the back current becomes increasingly more important. The circuit shown in Fig. 2 takes into account the relationship of the back current to the forward current and is thus more suitable for an instrument employing smaller currents.

From the above it will appear that by means of our invention the irregularities in rectifiers which ordinarily interfere with proper scale distribution may be overcome so that exactly the same printed scales may be used for each of a plurality of similar units. It will be understood, of course, that the circuit shown in Fig. 1 is not necessarily limited to use with voltmeters, and likewise the circuit of Fig. 2 is not limited to use with milliammeters. The specific examples of circuit values described above are not intended to limit the scope of the invention to those values, but are merely given by way of example. It will also appear that the amount of adjustment which may be available will depend upon the particular characteristics of the circuit involved and that the invention may be employed to calibrate devices at load values other than one half, as used for illustration.

Since various modifications of the apparatus shown and described may be made without departing from the spirit and scope of the invention, it is intended that it should be limited only by the following claims interpreted in view of the prior art.

We claim as our invention:

1. A device for measuring an alternating current quantity comprising a contact type bridge rectifier, electrical conducting means for impressing said quantity to be measured on said rectifier, a direct current responsive instrument, electrical conducting means for connecting said instrument for energization in accordance with the direct current output of said rectifier, and a variable impedance connected in each of said conducting means for adjusting the relative degrees of energization of said instrument at different predetermined magnitudes of said quantity to be measured, the said impedance in said second conducting means having resistance characteristics.

2. A device for measuring an alternating current quantity comprising a contact type bridge connected rectifier, electrical conducting means for energizing said rectifier in proportion to said quantity to be measured, a direct current responsive instrument, electrical conducting means for connecting said instrument for energization in accordance with the direct current output of said rectifier, and a variable resistance connected in the circuit of each of said conducting means for adjusting the relative values of the current flowing through said instrument at different predetermined magnitudes of said quantity to be measured.

3. A device for measuring an alternating current quantity comprising a contact type, full wave, bridge connected rectifier, a variable resistance, electrical conducting means for connecting said variable resistance and said rectifier in series circuit for energization by said quantity to be measured, a direct current responsive moving coil type measuring instrument, a second variable resistance, and electrical conducting means connecting said second resistance and said moving coil in series circuit for energization by the direct current output, whereby said resistances may be varied to adjust the amount of current flowing through said coil at a first predetermined magnitude of said quantity to be measured without substantially changing the current therethrough at a different predetermined magnitude of said quantity.

4. A device for measuring an alternating current quantity comprising a contact type, bridge connected rectifier upon which the quantity to be measured is impressed, a direct current responsive instrument, a pair of variable impedances, and electrical conducting means for connecting said instrument to be energized in proportion to the output of said rectifier with one of said impedances connected to adjust the output current of the rectifier and the other of said impedances connected to adjust the proportion of the output current flowing through said instrument.

5. A device for measuring an alternating current quantity comprising a contact type bridge connected rectifier upon which the quantity to be measured is impressed, a direct current responsive instrument, a pair of variable resistances, and electrical conducting means for connecting said instrument to be energized in proportion to the direct current output of said rectifier with one of said resistances connected in series with the output terminals of the rectifier and the other of said resistances connected to adjust the distribution of the output current between said instrument and a shunt circuit.

6. A device for measuring an alternating current quantity comprising a full wave, contact type, bridge connected, rectifier upon which the quantity to be measured is impressed, a direct current responsive instrument, a first resistance member connected in closed circuit with said instrument, means connecting one terminal of said instrument with a first output terminal of said rectifier, a variable resistance one terminal of which is connected to the second output terminal of said rectifier, and means connecting the other terminal of said variable resistance to an adjustable point on said first resistance to energize said instrument with a current proportional to the output current of said rectifier and permit adjustment of this proportion by means of said first resistance.

RICHARD C. HITCHCOCK.
UEL L. SMITH.